Patented Nov. 13, 1951

2,575,170

UNITED STATES PATENT OFFICE 2,575,170

SOIL STABILIZATION

August Holmes, Cranford, N. J., assignor to Standard Oil Development Company, a corporation of Delaware No Drawing. Application June 6, 1945, Serial No. 597,973

1 Claim. (Cl. 94—25)

This invention relates to improvements in soil stabilization and particularly in treating and consolidating mixtures of coarse and fine aggregates to form rigid, semi-rigid and even plastic layers to serve as base supports for bituminous pavements.

Failure of pavements, especially thin asphaltic pavements, in latitudes where they are subjected to frost, occurs primarily because of lack of adequate sub-support. The common remedy, used heretofore, was to build bases under the pavements of adequate thickness and bearing capacity to avoid sub-soil disturbances caused by frost heaving or excessive amounts of water. This led to the practice of furnishing consolidated layers of gravel or stone, which were consolidated to form the well-known macadam method of road construction. Consolidated layers of gravel or stone, even when properly graded, are, however, subjected to considerable disturbance over a period of time because of these layers being subjected to water infiltration and subsequent freezes and disruption of the structural continuity of the base. Besides this difficulty, however, infiltration of water, through capillarity or other causes, into densely compacted masses of mineral aggregate also disrupts continuity of the masses by destroying the natural bonding and cementing properties of whatever mineral cohesive materials there might be in the masses, such as clay or lime and magnesia particles, that might have been introduced by design or formed during the crushing and consolidation processes.

In recent years considerable attempts have been made to stabilize and waterproof layers of soil, gravel and stone, or even silty material, by dispersing small quantities of bituminous material throughout these masses. Other waterproofing materials have also been used, such as resin. All types of bituminous materials have been used to waterproof and stabilize soil and good results have been obtained using residual oils, cutback oils and bituminous emulsions. Bituminous stabilization often has the advantage of more economically converting soils existing on the construction site to a satisfactory state for use than can be obtained by the addition of coarser materials which must be imported to the job or which may not be at all obtainable.

The more recent practice in soil stabilization is to disperse through the masses of gravel and stone sufficient fine and naturally cohesive materials, such as clay, to make the whole mass entirely dense as well as impart natural cementitiousness. It is well known that a natural concrete of considerable strength can be prepared by mixing masses of gravel with cohesive clay, using water as the dispersion medium, mixing and compacting the mass to maximum density and subsequently eliminating the water by evaporation.

The consolidated mass serves the purpose intended provided no water comes in contact with it. If the consolidated mass is subjected to subsoil and surface water infiltration, this water will be absorbed to a degree where the whole consolidated mass will lose its structural strength or bonded continuity. The water destroys the natural bonding properties of the clay and the whole mass will readily be destroyed under loads. Water infiltration in the above described masses can be eliminated by dispersion of bituminous materials along with the natural cohesive clays. This practice requires not only that the natural cohesive materials, such as clay, be uniformly dispersed throughout the masses of gravel, sand or soil, but also that small quantities of bitumen be uniformly dispersed throughout an immense mass of aggregate to obtain proper and uniform dispersion of the cohesive clays and small quantities of bitumen. This work is usually carried out by the so-called road-mixing or mix-in-place methods.

According to this invention it has been found that higher strength and higher dry soil densities in the soil can be obtained by impregnating the soil by the use of non-aqueous liquids. The classes of liquids primarily suited for this preparation are the organic acids, aldehydes, ketones, ethers, esters, petroleum hydrocarbons, aromatic hydrocarbons, such as aniline, xylene, etc., ethyl silicate, and alcohols having relatively low viscosity accompanied with relatively low vapor tension. Liquids particularly suited for this purpose are oils of low viscosity, not over Saybolt 100 seconds at 100° F., and other liquids having viscosities preferably near that of water, and showing relatively low solubility in water.

The following table illustrates the improvement in density and strength of the soils treated according to this method:

erally, the soil is first treated with a small amount of water, and mixed with a non-aqueous liquid, such as a low-viscosity petroleum hydrocarbon.

Table

| Soil | Rancho Boyeros | | | La Aurora | | | New Jersey | | | Brownsville | | |
|---|---|---|---|---|---|---|---|---|---|---|---|---|
| Liquid | cc./100 g. Soil | Dry Soil Density, #/cu. ft. | Hubbard-Field Strength, lbs. | cc./100 g. Soil | Dry Soil Density, #/cu. ft. | Hubbard-Field Strength, lbs. | cc./100 g. Soil | Dry Soil Density, #/cu. ft. | Hubbard-Field Strength, lbs. | cc./100 g. Soil | Dry Soil Density, #/cu. ft. | Hubbard-Field Strength, lbs. |
| Water | 15 | 109.6 | 5,800 | 15 | 97.4 | 6,550 | 14 | 117.8 | 650 | 14 | 106.9 | 2,125 |
| Absolute Alcohol | | | | | | | 14 | 121.5 | 1,675 | 14 | 113.1 | 4,100 |
| Isopropyl Alcohol | 15 | 107.0 | 6,950 | 15 | 103.8 | 4,450 | | | | | | |
| Acetone | 15 | 106.6 | 7,650 | 15 | 102.0 | 5,000 | | | | | | |
| Petroleum[1] Hydrocarbon | 15 | 101.3 | 9,400 | 15 | 98.7 | 7,350 | 14 | 115.8 | 4,325 | 14 | 104.0 | 7,900 |
| Do[2] | | | | | | | 14 | 116.3 | 3,275 | 14 | 101.4 | 6,475 |
| Amylacetate | | | | | | | 14 | 119.2 | 1,825 | 14 | 113.8 | 3,175 |
| Carbon Tetrachloride | | | | | | | 14 | 112.0 | 3,950 | 14 | 100.8 | 7,200 |
| Xylene | | | | | | | 14 | 117.3 | 3,550 | 14 | 105.4 | 4,800 |

[1] Having a boiling range of 306° to 394° F., A. P. I. gravity of 45.6°, and Thermo viscosity of 230 seconds.
[2] Having an A. P. I. gravity of 35.4° and Saybolt viscosity of 80 to 90 seconds at 100° F.

In this table the Hubbard-Field strength is a standard test employed to determine the bonding of the samples tested. The test is conducted by preparing a briquette of the treated soil which is 1 inch thick and 2 inches in diameter. This briquette is then extruded through a 1¾ inch orifice. The load required to extrude the briquette through this orifice is the Hubbard-Field strength. It will be noted tests were made with soils from four different sources. In each case the treating liquid was mixed with the soil in proportions given in the table as cc.'s of liquid per 100 grams of soil. The dry soil density in pounds per cubic feet is also given. For example, it was found that on mixing 14 cc. of water per 100 grams of Brownsville soil a Hubbard-Field strentgh of 2125 pounds was obtained. However, when mixing 14 cc. of xylene per 100 grams of the same soil, a Hubbard-Field strength of 4800 pounds was obtained. These figures indicate that xylene is a considerably better treating agent than water in consolidating the soil used.

Ethyl silicate was found to be particularly adaptable for this particular purpose in that it slowly hydrolyzes when incorporated with the soil and a little water and an adhesive form of silica is deposited. It serves both as a preservative and waterproofing agent for the sub-soil and, likewise, aids the bonding of the sub-soil. It is especially resistant to water after it has once deposited the silica. It is preferably used in the form of an aqueous emulsion when mixing with soil. The soil may be treated with a clay before impregnating with a non-acqueous liquid. Gen-

I claim:

A process for building of roads which consists in mixing the underlying soil with a xylene and then laying a pavement thereover.

AUGUST HOLMES.

REFERENCES CITED

The following references are of record in the file of this patent:

UNITED STATES PATENTS

| Number | Name | Date |
|---|---|---|
| 1,546,540 | Hunt | July 21, 1925 |
| 1,955,077 | MacKenzie | Apr. 17, 1934 |
| 2,003,861 | McConnaughay | June 4, 1935 |
| 2,012,566 | Ingalls | Aug. 27, 1935 |
| 2,195,573 | Kritchevsky | Apr. 2, 1940 |
| 2,314,181 | Winterkorn | Mar. 16, 1943 |
| 2,330,747 | Roediger | Sept. 28, 1943 |
| 2,357,124 | Miller | Aug. 29, 1944 |
| 2,386,163 | Holmes | Oct. 2, 1945 |
| 2,394,017 | Seaman | Feb. 5, 1946 |
| 2,397,782 | Flynn | Apr. 2, 1946 |

OTHER REFERENCES

"Principles of Highway Construction," Public Roads Admin., 1943, pp. 135, 153, 203, and 206. (Copy in Div. 33.)

"Soil Stabilization," Seaman Motors, Milwaukee, 1943, pp. 5 and 27. (Copy in Div. 33.)

Asphalt Pocket Reference for Highway Engineers, by the Asphalt Institute, 1937, page 13. (Copy in Div. 33.)